(12) United States Patent
Morrison (10) Patent No.: US 9,242,728 B2
(45) Date of Patent: Jan. 26, 2016

(54) ALL-ELECTRIC MULTIROTOR FULL-SCALE AIRCRAFT FOR COMMUTING, PERSONAL TRANSPORTATION, AND SECURITY/SURVEILLANCE

(71) Applicant: Alakai Technologies Corporation, Hopkinton, MA (US)

(72) Inventor: Brian D. Morrison, Hopkinton, MA (US)

(73) Assignee: ALAKAI TECHNOLOGIES CORPORATION, Hopkinton, MA (US)

( * ) Notice: Subject to any disclaimer, the term of this patent is extended or adjusted under 35 U.S.C. 154(b) by 94 days.

(21) Appl. No.: 14/452,245

(22) Filed: Aug. 5, 2014

(65) Prior Publication Data

US 2015/0353192 A1   Dec. 10, 2015

Related U.S. Application Data

(60) Provisional application No. 61/863,157, filed on Aug. 7, 2013.

(51) Int. Cl.
*G05D 1/00* (2006.01)
*B64C 27/08* (2006.01)
*B64C 27/32* (2006.01)

(52) U.S. Cl.
CPC ............... *B64C 27/08* (2013.01); *B64C 27/32* (2013.01)

(58) Field of Classification Search
CPC .... B64C 29/0033; B64C 13/42; B64C 27/28; B64C 27/32; B64C 29/00; B64C 3/56; B64C 39/04; B64C 39/10; B64C 39/12; B64F 5/0036; F16H 25/205; F16H 25/2204; Y10T 74/18592; Y10T 74/19767; Y02T 50/12

USPC ........... 701/3, 4; 244/17.23, 17.25, 17.27, 26, 244/6–11
See application file for complete search history.

(56) References Cited

U.S. PATENT DOCUMENTS 5,106,035 A   4/1992   Langford
6,314,366 B1   11/2001   Farmakis et al.
(Continued)

OTHER PUBLICATIONS

NASA—Puffin Electric-VTOL-Concept-Cover.*
NASA—Puffin Electric-VTOL-Concept.*
NASA—Puffin: A passion for personal flight.*
(Continued)

*Primary Examiner* — Muhammad Shafi
(74) *Attorney, Agent, or Firm* — Sean D. Detweiler, Esq.; Morse, Barnes-Brown & Pendleton, P.C.

(57) ABSTRACT

Methods and systems for a full-scale vertical takeoff and landing manned or unmanned electric aircraft, having an all-electric, non-hydrocarbon-powered lift and propulsion system, an integrated avionics system for navigation and guidance, and simple joystick and throttle controls to provide the operator with 'drive by wire' style direction control. The vehicle employs counter-rotating sets of propellers and lift is provided by multiple pairs of small electric motors driving directly-connected, counter-rotating sets of propellers. Automatic computer monitoring by one or a plurality of programmed redundant digital motor management computer or autopilot controls each motor-controller and motor to produce pitch, bank and elevation, while simultaneously restricting the flight regime that the pilot can command. Sensed multi-axis information and parameter values about vehicle state are used to provide stable vehicle control and to detect when stable vehicle operating limits are about to be exceeded.

19 Claims, 9 Drawing Sheets

(56) References Cited

U.S. PATENT DOCUMENTS

| | | |
|---|---|---|
| 2007/0034738 A1 | 2/2007 | Sanders et al. |
| 2011/0102198 A1 | 5/2011 | Deleris et al. |
| 2012/0056040 A1* | 3/2012 | Brotherton-Ratcliffe ... B64C 27/20 244/23 A |
| 2012/0083945 A1 | 4/2012 | Oakley et al. |
| 2014/0027564 A1 | 1/2014 | Mercer et al. |
| 2014/0339354 A1* | 11/2014 | Gaillimore .............. B64C 39/12 244/12.4 |

OTHER PUBLICATIONS

Moore, "NASA Puffin electric Tailsitter VTOL Concept", Aerospace Engineer, Aeronautics Systems Analysis Branch, NASA Langley, MS442, AIAA Member, American Institute of Aeronautics and Astronautics, 2010.*

NASA-Puffin: A passion for personal flight.*

Federal Aviation Administration website https://www.faasafety.gov/gslac/ALC/course_content.aspx?cID=42&sID=505).

International Search Report for International Application PCT/US2015/028345, dated Sep. 17, 2015.

* cited by examiner

ALL-ELECTRIC MULTIROTOR FULL-SCALE AIRCRAFT FOR COMMUTING, PERSONAL TRANSPORTATION, AND SECURITY/SURVEILLANCE

RELATED APPLICATIONS

This application claims the benefit of U.S. Provisional Patent Application No. 61/863,157, filed on Aug. 7, 2013.

BACKGROUND

Field of the Invention

The present invention is directed to full-scale (as opposed to reduced scale or model) 'green' or non-hydrocarbon powered electric multirotor aircraft design, implementation and operation. It finds particular, although not exclusive, application to electric battery powered (Electric Vehicle or EV) multirotor aircraft, or electric battery-powered multirotor aircraft supplemented by on-board recharging sources, such as a motor-generator, solar, or fuel cell or other portable source of recharging power. The present invention is not designed for reduced scale or model aircraft, having unique capabilities, features, redundancy, safety and other features necessary to the reliability and safety of on-board passengers and operators that are necessary to maintain flight-worthiness.

DESCRIPTION OF THE RELEVANT ART

Although reduced scale multirotor aircraft (sometimes called multicopters) are not new, they have been reduced scale models not intended for the rigors or requirements of carrying human passengers, and are mostly used either as toys, or for limited-duration surveillance or aerial photography missions with motion being controlled by radio-control remotes. For example, US Patent Application 20120083945 relates specifically to a reduced scale multicopter, but does not address the safety, structural, or redundancy features necessary to an FAA-certified passenger-carrying implementation, nor any of the systems required to implement a practical, passenger-carrying vehicle with fault-tolerance and state-variable analysis. The dynamics and integrity requirements of providing a full-scale aircraft capable of safely and reliably carrying human passengers and operating within US and foreign airspace are significantly different that those of previous reduced scale models.

Therefore, a full scale multicopter implementation that finds applications for commuting, for recreation, for inter-city transportation, for industrial, or for security and surveillance applications among others with human passengers on board, based on state-of-the-art electric motor and battery and computer technology with high reliability, safety, simplicity, and redundant control features, coupled with advanced avionics and flight control techniques is described.

BACKGROUND INFORMATION

A large volume of personal travel today occurs by air. For destinations of more than 500 miles, it has historically been the fastest travel mode and, in terms of injuries per passenger mile, the safest. However, only about 200 hub and spoke airports exist within the US, placing much of the population more than 30 minutes away from an airport. Yet there are over 5,300 smaller control-towered regional airports, and over 19,000 small airfields with limited or no control towers throughout the US, placing more than 97% of the population within 15 to 30 minutes of an airfield. As many have noted before, this is a vastly under-utilized capability.

In the 21st Century, the opportunity is available to apply advanced technologies of the evolving National Airspace System (NAS) to enable more-distributed, decentralized travel in the three-dimensional airspace, leaving behind many of the constraints of the existing hub-and-spoke airport system, and the congestion of the 2-dimensional interstate and commuter highway systems.

Many large cities such as Boston, Houston, Los Angeles and other major metropolitan areas are virtually gridlocked by commuter traffic, with major arteries already at or above capacity, and with housing and existing businesses posing serious obstacles to widening or further construction. NASA, in its 'Life After Airliners' series of presentations[1,2] and NASA's Dr Bruce Holmes[3], make the case for a future of aviation that is based on the hierarchical integration of Personal Air Vehicles (PAV), operating in an on-demand, disaggregated, distributed, point-to-point and scalable manner, to provide short haul air mobility. Such a system would rely heavily on the $21^{st}$ century integrated airspace, automation and technology rather than today's centralized, aggregated, hub-and-spoke system. The first, or lowest tier in this hierarchical vision are small, personal Air Mobility Vehicles or aircraft, allowing people to move efficiently and simply from point-to-any-point, without being restricted by ground transportation congestion or the availability of high-capability airports. Key requirements include reduced or eliminated noise impacts to communities, vehicle automation, operations in non-radar-equipped airspace and at non-towered facilities, green technologies for propulsion, increased safety and reliability, and en-route procedures and systems for integrated operation within the National Airspace System (NAS) or foreign equivalents. Ultimate goals cited by NASA include an automated self-operated aircraft, and a non-hydrocarbon-powered aircraft for intra-urban transportation. NASA predicts that, in time, up to 45% of all future miles traveled will be in Personal Air Vehicles.

[1] Life After Airliners VI, EAA AirVenture 2003, Oshkosh, Wis. Aug. 3, 2003.
[2] Life After Airliners VII, EAA AirVenture 2004, Oshkosh, Wis. Jul. 30, 2004.
[3] Small Aircraft Transportation System—A Vision for $21^{st}$ Century Transportation Alternatives, Dr. Bruce J. Holmes, NASA Langley Research Center. 2002.

This invention addresses part of the core vision established by NASA, and documents the concept and design of an all-electric multirotor vehicle, referred to herein as a multirotor, or an ecopter, as one part of the On-Demand, Widely Distributed Point-to-Any Point $21^{st}$ Century Air Mobility system. Operation of the vehicle is simple and attractive to many operators when operating under Visual Flight Rules (VFR) in Class E or Class G airspace (for an understanding of airspace classes, please refer to the FAA website at https://www.faasafety.gov/gslac/ALC/course_content.aspx?cID=42&sID=505), thus in most commuter situations not requiring any radio interactions with Air Traffic Control towers.

SUMMARY

The present invention relates to a full-scale vertical takeoff and landing manned or unmanned aircraft having a lightweight airframe containing an all-electric lift and propulsion system mounted to a lightweight multirotor upper truss structure, counter-rotating AC or DC brushless electric motors each driving a propeller or rotor, an integrated 'highway in the sky' avionics system for navigation, simple joystick and throttle controls to provide the operator with 'drive by wire' style direction control, and ADSB or ADSB-like capability to provide traffic and situational awareness, weather display and collision avoidance. Power is provided through a system of high-energy-density batteries consisting of multiple rechargeable cells, a battery management system (BMS) to autonomously monitor and control charging and discharging of said batteries, and motor controllers to control the commanded voltage and torque to each motor and to measure its RPM, current and temperature. As a multirotor and all-electric aircraft, the vehicle does not fall into the standard 'fixed wing' or 'helicopter' or "lighter-than-air" categories, and may require a new classification scheme in coordination with the Federal Aviation Administration and foreign regulatory authorities.

The vehicle has no tail rotor, and lift is provided by multiple small, inexpensive electric motors driving directly-connected, counter-rotating pairs of propellers, also referred to as rotors. The use of counter-rotating propellers on each pair of motors cancels out the torque that would otherwise be generated by the rotational inertia. Automatic computer monitoring by a programmed redundant digital Motor Management Computer controls pitch, bank and elevation, while simultaneously restricting the flight regime that the pilot can command, to protect the pilot from inadvertent steep bank or pitch, or other potentially harmful acts that might lead to loss of control. Sensed parameter values about vehicle state are used to detect when recommended vehicle operating parameters are about to be exceeded. By using the results of the state measurements to inform flight control commands, the methods and systems contribute to the operational simplicity, stability and safety of the vehicle.

Among the many uses for this class of vehicle are the next generation of personal transportation including commuting, local travel, air taxi and recreation where operators need not have the level of piloting skills necessary for more complex, traditional aircraft or helicopters. The vehicle also has application to aerial surveillance, security and reconnaissance, that will be of utility to law enforcement, border patrol, emergency relief aid (disaster relief), military surveillance and commercial users.

The vehicle is equipped with redundant Motor Management Computers to measure control inputs by the operator (throttle and sidearm controller aka joystick) and manage commands to the electric motor controllers, advanced avionics and GPS equipment to provide location, terrain and 'highway in the sky' displays, and a simplified, car-like control system that allows even casual users to master the system after a demonstration flight. Control inputs can be made using a hand throttle or a foot pedal for vertical lift (propeller RPM) control, either a sidearm controller (joystick) or steering wheel for pitch (nose up/down angle) and bank (angle to left or right) control, or a 3-axis joystick to combine pitch, bank and thrust in a single control element, depending on user preferences. The Motor Management Computer measures control inputs by the operator (throttle and joystick positions), translates this into commands to the controllers for the individual electric motors according to a known performance table, then supervises motor reaction to said commands, and monitors vehicle state data (pitch, bank, yaw, pitch rate, bank rate, yaw rate, vertical acceleration, lateral acceleration, longitudinal acceleration, GPS speed, vertical speed air speed and other factors) to ensure operation of the vehicle remains within the desired envelop.

BRIEF DESCRIPTION OF THE DRAWINGS

The invention description below refers to the accompanying drawings, of which.

DETAILED DESCRIPTION OF THE ILLUSTRATIVE EMBODIMENTS

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods.

Figure 1:
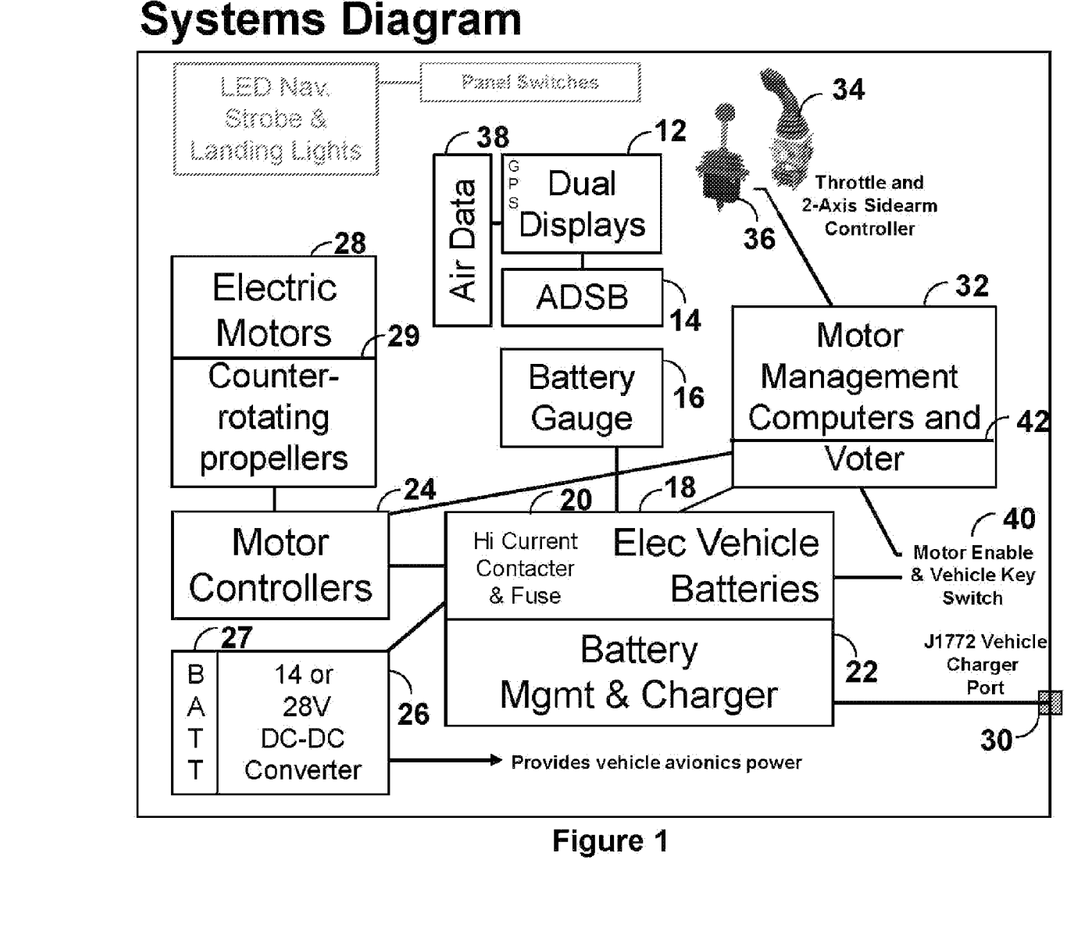
FIG. 1 shows a block diagram showing apparatus for practicing the present invention.

FIG. 1 depicts in block diagram form one type of system that may be employed to carry out the present invention's teachings. Here, this one- to two-person general aviation aircraft includes on-board equipment such as a primary flight displays 12, an Automatic Dependent Surveillance-B (ADSB) transmitter/receiver 14, a global-positioning system (GPS) receiver typically embedded within 12, a fuel or battery State of Charge (SOC) display 16, an air data computer to calculate airspeed and vertical speed 38, all of which monitor either the operation and position of the aircraft or the electric battery systems 18 and provide display presentations that represent various aspects of those systems' operation and the aircraft's state data, such as altitude, ground speed, position, local terrain, recommended flight path, weather data, remaining battery charge and flying time, motor voltage and current status, intended destination, and other information necessary to a successful and safe flight. Vehicle attitude (pitch, bank, and altitude) and state are commanded by the operator using the throttle 36 and sidearm controller 34. The throttle could also be embodied in a foot pedal, similar to an automotive foot pedal, where the throttle or foot pedal provides a single or dual-redundant variable voltage or potentiometer reading indicative of commanded thrust to the motor computer. The sidearm controller or joystick could also be embodied in a 'steering wheel' or control yoke capable of left-right and fore-aft motion, where the 2-axis joystick or control yoke provides two independent sets of single- or dual-redundant variable voltage or potentiometer settings indicative of pitch command (nose up or nose down) and bank command (left side up or left side down).

Position commands from these two sets of devices are read by the motor management computer 32, where control algorithms operating within the motor management computer perform the necessary state analysis, comparisons, and generate resultant commands to the individual motor controllers and monitor the results. Commands are sent to the multiple sets of motor controllers 24 over a serial bus, which could be serial RS232, Controller Area Network (CAN), Ethernet, or another similar serial communications means. A voting means 42 decides which two of three motor management computers are in agreement, and performs the voting operation to connect the proper serial bus to issue commands to the motor controllers.

Motors in the preferred embodiment are pancake, axial flux brushless synchronous three-phase AC or DC brushless motors capable of operating as an aircraft motor, and that are either air-cooled or liquid cooled or both.

Throughout all of the system operation, controlling and operating the vehicle is performed with the necessary safety, reliability, performance and redundancy measures required to protect human life to accepted flight-worthiness standards.

Energy to operate the vehicle is stored by the electric vehicle batteries 18, which provide voltage and current for operation of the motors to the motor controllers 24 through high-current contactor and fuse 20. The high current contactor is engaged and disengaged under control of the Vehicle Key Switch 40, similar to a car's ignition switch. The motor controllers 24 each individually manage the necessary voltage and current to achieve the desired RPM and torque (collectively, the thrust) produced by each motor and propeller combination 28. The number of motor controllers and motor/propeller combinations per vehicle may be as few as 6, and as many as 16 or more, depending upon vehicle architecture, desired payload (weight), and vehicle structure.

Electric vehicle batteries 18 are monitored at all times by Battery Management and Charger 22, and are recharged by Charger 22 through external J1772-compatible Vehicle Charger connector 30. This allows the vehicle charger to remain compatible with automotive electric vehicle recharging stations, according to J1772 or similar standards. The ability to recharge the multirotor aircraft's batteries at the origin, at the destination, or at roadside EV charging stations is fundamental to the vehicle's utility and acceptance by the commuting public.

Due to the nature of the all-electric vehicle, it is also possible to carry a small electric generator powered by gasoline, propane, natural gas, hydrogen fuel cell, solar or other sources to recharge the on-board batteries, and in some instances may be desirable to operate the vehicle at the end of an electrical and data tether, for long-duration unmanned airborne surveillance, security or other applications. In this situation, power would be replenished or provided via the tether cable, and control information could be provided either by onboard systems as described herein, or by bidirectional wired or broadband or wireless or RF networks operated by ground controllers, similar to UAV operation by the military.

Power to operate the vehicle's avionics 12 14 16 32 34 36 38 and support lighting is provided by DC to DC Converter 26 and Battery 27, where DC to DC Converter 26 provides charging power to the avionics battery 27. DC to DC Converter 26 draws power from Electric Vehicle Batteries 18 and down-converts the higher Electric Vehicle Battery voltage, typically 300V DC to 400 VDC in this embodiment, to either 12V or 28V standards, either of which are voltages typically used in small aircraft systems. Navigation, Strobe and Landing lights draw power from 26, and provide necessary aircraft illumination for safety and operations at night under US and foreign airspace regulations.

Pairs of motors are commanded to operate at different RPM or Torque settings to produce slightly differing amounts of thrust under computer control, thus imparting a pitch moment, or a bank moment, or a change in altitude, or simultaneously all of the above to the aircraft, using position feedback from on-board 6-axis inertial sensors to maintain stable flight attitude. Sensor data is read by each node to assess its physical motion and rate of motion, which is then compared to commanded motion in all three dimensions to assess what new motion is required.

Of course, not all aircraft will employ the same mix of avionics, instrumentation or controllers or motors, and some aircraft will include equipment different from this mix or in addition to this mix. Not shown for example are radios as may be desirable for communications, or other small ancillary avionics customary in general aviation aircraft of this size. Whatever the mix is, though, some set of equipment accepts input commands from an operator, translates those input commands into differing thrust amounts from the pairs of counter-rotating motors and propellers, and thus produces pitch, bank, and vertical motion of the aircraft. When combined with avionics, instrumentation and display of the aircraft's current and intended location, the set of equipment enables the operator to easily and safely operate and guide the aircraft to its intended destination.

Figure 2:
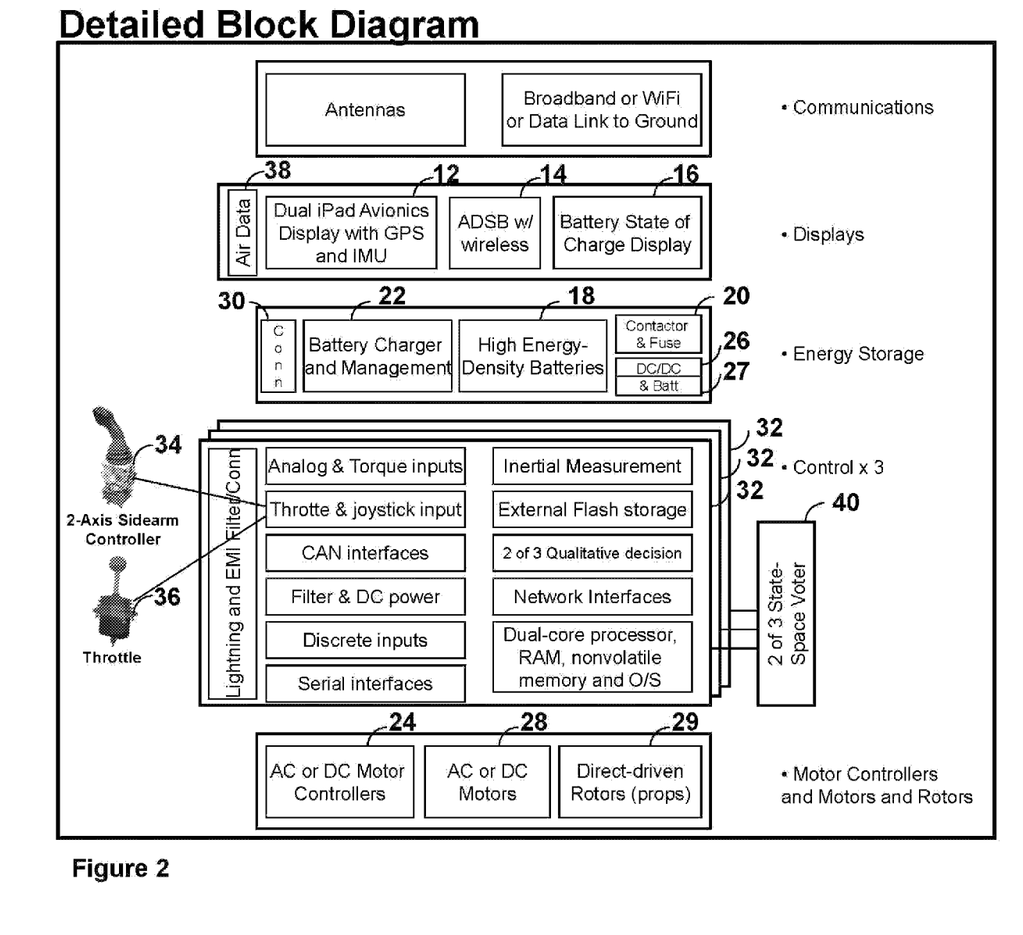
FIG. 2 shows a detailed block diagram, detailing the key features of the redundant Motor Management Computer and voting in relation to the overall system.

Motor Management Computer 32 is embodied in a microprocessor-based circuit and includes the various interface circuitry required to communicate with the aircraft's data busses, throttle and sidearm controller, and motor controller apparatus 24. This is further detailed in FIG. 2. In addition, motor management computer 32 may also be configured for automatic recording of aircraft position, aircraft state data, velocity, altitude, pitch angle, bank angle, thrust, and other parameters typical of capturing aircraft position and performance, for later analysis or playback. To accomplish these requirements, said MMC contains an embedded air data computer (ADC) and embedded inertial measurement sensors, although these data could also be derived from small, separate stand-alone units. The MMC may be operated as a single controller, but for reliability and safety purposes, the preferred embodiment uses a triple redundant MMC, where the units share information, decisions and intended commands in a co-operative relationship. In the event of a serious disagreement outside of allowable guard-bands, the operator is notified, and assuming three units are present, a 2-out-of-3 vote determines the command to be implemented by the motor controllers. The operator is then notified of the controller disagreement, so that the units may be scheduled for further diagnostics post-flight.

The sidearm controller is a dual-sensor device in each axis, typically with a spring return so that any displacement pressure must be maintained, or the arm will return under its own volition to the null or center position. Forward motion is sensed by a pair of two (redundant) Hall Effect sensors, and lateral motion is sensed by a second set of two (redundant) Hall Effect sensors located at right angles to the first pair. Hall Effect sensors are a non-contact sensing means that produces a small DC voltage proportional to the offset from the null of center position. Those voltages are then wired to analog-to-digital converter inputs on each node, so that each node can read for itself what the commanded action should be.

There are three phases that connect from each high-current controller to each motor for a synchronous AC or DC brushless motor. Reversing the position of any two of the 3 phases will cause the motor to run the opposite direction. There is alternately a software setting within the motor controller that allows the same effect, but it is preferred to hard-wire it, since the designated motors running in the opposite direction must also have propellers with a reversed pitch (these are sometimes referred to as left-hand vs right-hand pitch, or puller (normal) vs pusher (reversed) pitch propellers.

In the illustrated embodiment, the operational analyses and control algorithms that will shortly be described are performed exclusively by the on-board Motor Management Computer 32, and flight path and other useful data are presented on the dual avionics displays 12. Various aspects of the invention can be practiced with a different division of labor; some or all of the position and control instructions can in principle be performed outside the aircraft, in ground-based equipment, by using a broadband or 802.11 Wi-Fi network or Radio Frequency (RF) data-link between the aircraft and the ground-based equipment. Batteries can be located within the vehicle, or could remain on the ground, with an electrical tether providing power to the aircraft motors. This would allow for tethered, manned or unmanned operation for long-duration surveillance or other missions where a larger payload is desired.

For the illustrative embodiment of FIG. 1, the representation of the highway in the sky display may consist of, for example, wickets or goal-posts appearing to fade into the depth of the display screen, thereby signifying where the aircraft is intended to fly. Other combinations of display graphics and terrain representations, as well as audible signals may be used to convey this or other information and/or warnings to the operator in whatever manner is most effective. For example, combinations of graphical depictions or audible messages could be used to indicate that the aircraft is being asked to depart outside of certain predetermined "cruise" or "intended" conditions, while the Motor Management Computer makes adjustments so as not to violate those intended conditions. As will be seen below, operating the aircraft within "cruise" or "intended" conditions serves the purpose of protecting the aircraft and the operator from unintended deviations or departure from safe flight.

The combination of the avionics display system coupled with the ADSB capability enables the multirotor aircraft to receive broadcast data from other nearby aircraft, and to thereby allow the multirotor aircraft to avoid close encounters with other aircraft; to broadcast own-aircraft position data to avoid close encounters with other cooperating aircraft; to receive weather data for display to the pilot and for use by the avionics display system within the multirotor aircraft; to allow operation of the multirotor aircraft with little or no requirement to interact with or communicate with air traffic controllers; and to perform calculations for flight path optimization, based upon own-aircraft state, cooperating aircraft state, and available flight path dynamics under the National Airspace System, and thus achieve optimal or near-optimal flight path from origin to destination.

Figure 3:
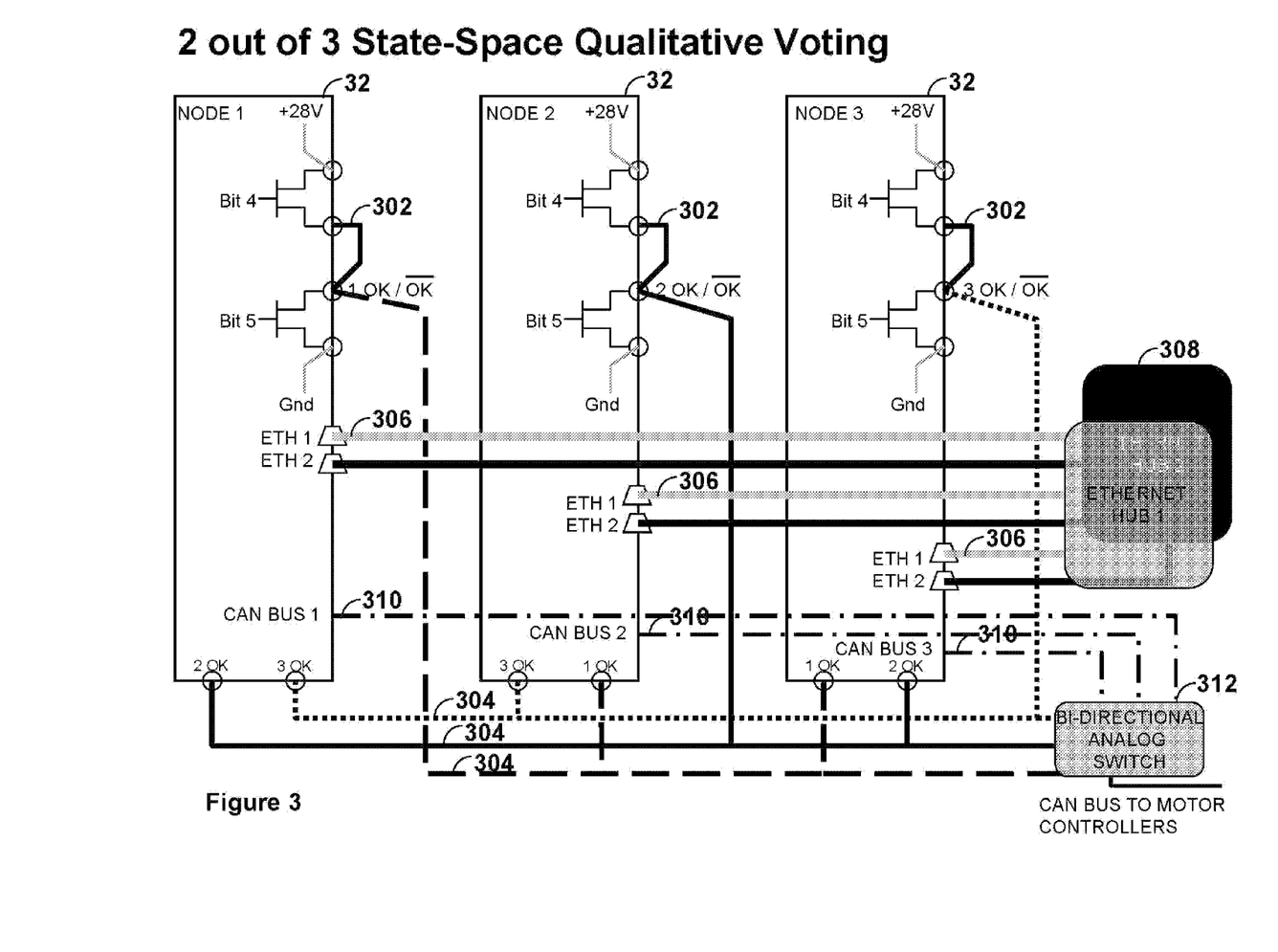
FIG. 3 shows a more detailed block diagram, focused on the fault-tolerant, triple-redundant voting control and communications means.

FIG. 3 is a diagram showing the voting process that is implemented to perform the qualitative decision process. Since there is no one concise 'right answer' in this real-time system, the MMCs or Nodes 32 instead share state-space variables among themselves that define the current aircraft state, the desired commands for motion, and the health of each Node. They then compare each other's state data, and assess whether they agree exactly (unlikely), agree within some allowable error bound (desired), or only 2 of 3 agree within some error bound, in which case the disagreeing node is suspect.

Note that the redundant communication systems are provided in order to permit the system to survive a single fault, while much of the actual qualitative comparisons that are needed to vote on a qualitative basis are performed by algorithms within the nodes.

The process or rules implemented by the voter are as follows:

a. Each node 32 asserts its bit 4 (302) when its internal health is good.

b. Upon initialization, nodes assess each other's health using status results 304. If all

| 1 OK | 2 OK | 3 OK | |
|------|------|------|---|
| H | H | H | ALL VOTES AGREE |
| H | H | L | 3 DISAGREES; 3 BAD |
| H | L | H | 2 DISAGREES; 2 BAD |
| H | L | L | 2 AND 3 DISAGREE; 1 BAD |
| L | H | H | 1 DISAGREES; 1 BAD |
| L | H | L | 1 AND 3 DISAGREE; 2 BAD |
| L | L | H | 1 AND 2 DISAGREE; 3 BAD |
| L | L | L | ALL DISAGREE; DUAL FAULT | nodes are good, one node (typically node 1) is assigned the role of timekeeper.

c. Each node only de-asserts its bit 4 if it detects an internal failure, or if its internal watchdog timer expires (indicating node or program failure).

d. Each node only asserts its bit 5 to ground if its result is outside the accepted variance of all 3 results through a mechanism to be described shortly.

e. The state of outputs 1.ok, 2.ok, 3.ok (304) remain high if nodes are healthy and result is acceptable. The state of outputs 1.ok, 2.ok, 3.ok (304) individually go low if one node is detected to have an error or a bad result.

f. The resulting logic from outputs 1.OK, 2.OK, and 3.OK informs the health status of the system as follows:

g. Each node publishes (sends a message with) its state-space results to the other two as a state table using communications channel 306. One, but by no means the only, means of communicating is by Ethernet using Linux sockets and network capabilities. Other communications means are certainly feasible, and obvious to one skilled in the art. A pair of Ethernet hubs 308 or similar network hubs provide redundant bidirectional communications between nodes 32.

h. Each node maintains its own state table plus state tables for the other two by node within its memory, and also maintains an allowable deviation table.

i. The timekeeper node issues an update request to the other two nodes at a periodic rate (referred to as the timekeeper's mark), then publishes its latest state table and waits for the other two nodes to publish.

j. Each node must then publish its results within a programmable delay after seeing the timekeeper's mark.

k. If the timekeeper's mark is not received after a allowable delay period, node 2 assumes timekeeping role and sends a message to node 1 to command node 1 to cease timekeeping.

l. All healthy nodes then test to compare the results within the state tables, and look for any variance that exceeds the allowable threshold.

m. State variables consist of, at a minimum, the following values from each node:

| INPUTS TO NODES | COMMANDS BY CONTROL NODE | PHYSICAL RESULTS |
|---|---|---|
| JOYSTICK X | MOTOR 1 RPM | RPM 1 ACTUAL |
| JOYSTICK Y | MOTOR 2 RPM | RPM 2 ACTUAL |
| THROTTLE Z | MOTOR 3 RPM | RPM 3 ACTUAL |
| PITCH | MOTOR 4 RPM | RPM 4 ACTUAL |
| BANK | MOTOR 5 RPM | RPM 5 ACTUAL |
| YAW | MOTOR 6 RPM | RPM 6 ACTUAL |
| PITCH RATE | MOTOR 7 RPM | RPM 7 ACTUAL |
| BANK RATE | MOTOR 8 RPM | RPM 8 ACTUAL |
| YAW RATE | MOTOR 1 TQ | CURRENT 1 ACTUAL |
| LONG ACCEL | MOTOR 2 TQ | CURRENT 2 ACTUAL |
| LAT ACCEL | MOTOR 3 TQ | CURRENT 3 ACTUAL |
| VERT ACCEL | MOTOR 4 TQ | CURRENT 4 ACTUAL |
| GPS SPEED | MOTOR 5 TQ | CURRENT 5 ACTUAL |
| GPS VERT SPEED | MOTOR 6 TQ | CURRENT 6 ACTUAL |
| AIRDATA KIAS | MOTOR 7 TQ | CURRENT 7 ACTUAL |
| AIRDATA VSPEED | MOTOR 8 TQ | CURRENT 8 ACTUAL | n. Bidirectional analog switch 312 monitors the state of 1.OK, 2.OK and 3.OK and uses those 3 logic levels to determine which serial bus 310 to enable so that motor control messages may pass between the controlling node and the motor controllers. This motor controller serial bus may be RS-232, CAN, Ethernet or a similar communications means. In a preferred embodiment, the CAN bus is employed; with CAN, each node and each motor controller has a unique "address" on the bus, thus enabling the controlling node to issue commands to, and receive unique responses from, each motor controller on the network. The controlling node then publishes these results as part of its next state data update to the other two nodes.

Figure 4:
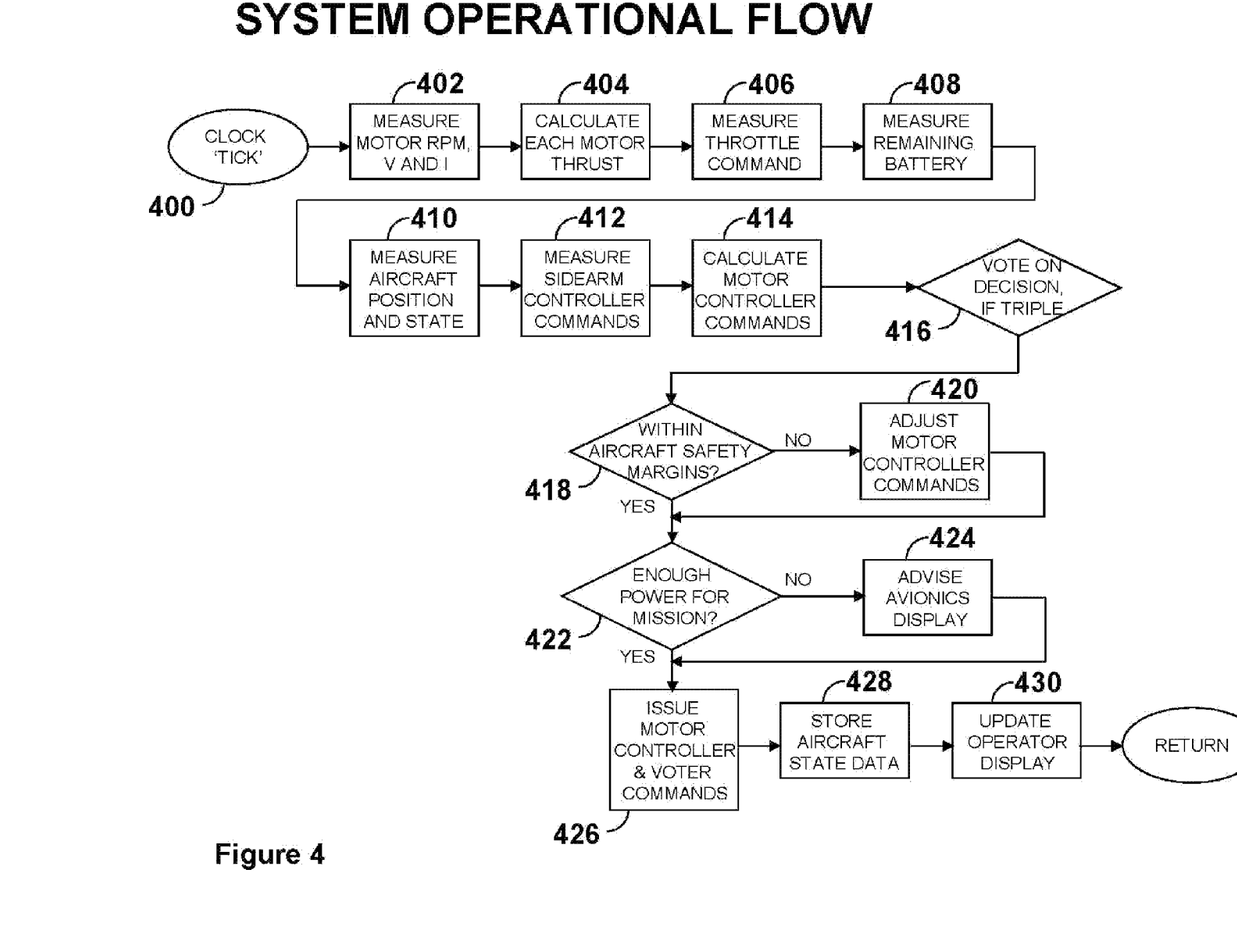
FIG. 4 shows a flow chart that illustrates one way in which the present invention can be implemented.

FIG. 4 is a flowchart that depicts in simplified form a measurement-analysis-adjustment-control approach that some embodiments of the invention may employ. The system enters the routine 400 periodically, at every "tick" of a periodic system clock, sometimes referred to as a real-time clock or processor clock. The frequency at which this occurs is selected to be appropriate to the parameters being sensed and the flight dynamics of the vehicle, and in some cases the frequencies may be different for different measurements. For the sake of simplicity, though, the frequency is the same for all of them, and, for the sake of concreteness, we apply an oversampling frequency of ten times per second or every 100 milliseconds, more or less.

As FIG. 4's block 402 indicates, the system first takes measurements of various sensor outputs indicative of each motor's performance, including propeller RPM, motor voltage, motor current and temperature. In this system, such measurement data may be readily accessed through each motor controller's serial data busses, and the illustrated embodiment selects among the various available measurement parameters that can be obtained in this manner.

With the motor data thus taken, the system performs various analyses, as at block 404, which may be used to calculate each motor's thrust and contribution to vehicle lift and attitude. Block 406 then measures the throttle command, by detecting where the throttle lever has been positioned by the operator and notes any change in commanded thrust from prior samples.

Block 408 measures the battery pack voltage, current drawn, and estimated remaining State of Charge by communicating with the Battery Gauge 16. This data is then used as part of the analysis of remaining flight duration for the trip or mission underway and is made available to the operator.

As FIG. 4's block 410 indicates, the Motor Management Computer 32 gathers a representative group of aircraft measurements from other onboard sensors including the MMC's air data sensors and embedded inertial sensors, and GPS data derived by receiving data from Display system 12. Such measurements may include air speed, vertical speed, pressure altitude, GPS altitude, GPS latitude and GPS longitude, outside-air temperature (OAT), pitch angle, bank angle, yaw angle, pitch rate, bank rate, yaw rate, longitudinal acceleration, lateral acceleration, and vertical acceleration.

For some of the parameters, there are predetermined limits with which the system compares the measured values. These may be limits on the values themselves and/or limits in the amount of change since the last reading or from some average of the past few readings.

Block 412 then measures the sidearm 2-axis controller command, by detecting where the sidearm controller has been positioned by the operator in two axis (pitch-bank) space and notes any change in commanded pitch-bank position from prior samples.

Block 414 then assimilates all of the vehicle state data and commanded data from the operator, and calculates the intended matrix of motor controller adjustments necessary to accommodate the desired motions. If the MMC is a single unit, then block 416 will determine that no further voting is necessary and pass the command matrix on to block 418. If the MMC is a triple redundant (voting node) unit as in a preferred embodiment, then Block 416 examines the intended matrix of motor controller adjustments, and compares them with the two other matrices of motor controller adjustments. In the event of any disagreement, block 416 assesses whether the matrix element(s) differ within an acceptable guard-band, or whether they disagree by more than the acceptable guard-band. If there is a disagreement, then the two matrices that are in closest agreement are averaged, and the result is passed on to block 418.

Block 418 in turn examines the intended matrix of commands, and assesses whether the intended actions are within the aircraft's safety margins. For example, if motor controller 3 is being commanded to output a certain current, is that current within the approved performance metrics for this aircraft. If not, block 420 makes adjustments to the matrix of motor controller commands, and provides an indication to the Display to indicate that vehicle performance has been adjusted or constrained.

Similarly, Block 422 examines the intended matrix of commands, and assesses whether the Battery System contains sufficient electrical power to accomplish the mission with margins and without compromising the overall success of the mission. For example, if all motor controllers are being commanded to output a higher current to increase altitude, is that current available and can this be done without compromising the overall success of the mission. If not, block 424 makes adjustments to the matrix of motor controller commands, and provides an indication to the Display to indicate that vehicle performance has been adjusted or constrained.

Block 426 then manages the communications necessary to update the node health output 304 and issues the commands to the motor controllers, and monitors their responses for correctness.

Block 428 then captures all of the available aircraft performance and state data, and determines whether it is time to store an update sample to a non-volatile data storage device, typically a flash memory device or other form of permanent data storage. Typically samples are stored once per second, so the system need not perform the storage operation at every 100 millisecond sample opportunity.

Block 430 then provides any necessary updates to the operator Display, and returns to await the next clock tick, when the entire sequence is repeated.

When the flight is complete, the operator or his maintenance mechanic can then tap into the recorded data and display it or play it back in a variety of presentation formats. One approach would be for the onboard display apparatus to take the form of computers so programmed as to acquire the recorded data, determine the styles of display appropriate to the various parameters, provide the user a list of views among which to select for reviewing or playing back (simulating) the data, and displaying the data in accordance with those views. However, although the illustrated embodiment does not rely on ground apparatus to provide the display, this could also be accomplished by an off-board or ground display or remote server system. The system does so by utilizing a so-called client-server approach where the on-board apparatus (data server) prepares and provides web pages; the ground display apparatus requires only a standard web-browser client to provide the desired user interface.

Figure 5:
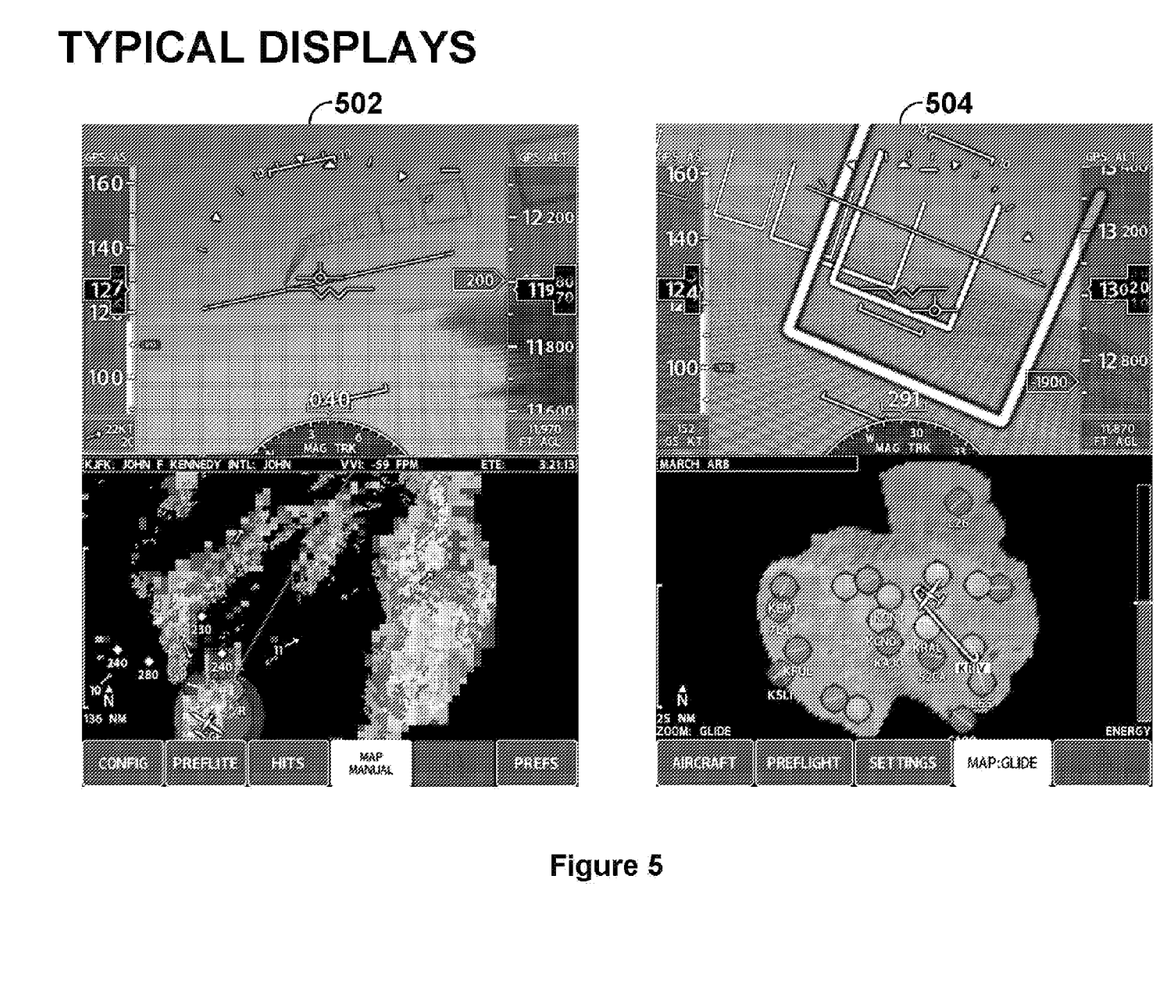
FIG. 5 shows an example of the type of $3^{rd}$-party display presentation that could be used to present data necessary to the 'highway in the sky' operation of the system of FIG. 1. Other display presentation embodiments are possible and may evolve and improve over time; the key is to provide a simple, clear, user-friendly visual interface that allows operators to fly from point A to point B under VFR in Class E or Class G airspace with minimal to no requirement for interaction with air traffic controllers

FIG. 5 depicts one kind of display presentation 502 that can be provided to show weather data (in the bottom half) and highway in the sky data (in the top half). Also shown are the vehicle's GPS airspeed (upper left vertical bar) and GPS altitude (upper right vertical bar). Magnetic heading, bank and pitch are also displayed, to present the operator with a comprehensive, 3-dimensional representation of where the aircraft is, how it is being operated, and where it is headed. Other screens can be selected from a touch-sensitive row of buttons along the lower portion of the screen. Display presentation 204 is similar, but has added 'wickets' to guide the pilot along the flight path. The lower half of the screen illustrates nearby landing sites that can readily be reached by the vehicle with the amount of power on board. Said display is notionally a software package installed and operating on a 'tablet' computer, most probably an Apple iPad. The use of two identical iPads running identical display software allows the user to configure several different display presentations, and yet still have full capability in the event that one display should fail during a flight. This enhances the vehicle's overall safety and reliability.

In addition to providing a browser-based communications mode, the on-board system also enables stored data to be read in other ways. For example, the on-board storage may also be examined and/or downloaded using a web server interface. Typically, but not necessarily, the on-board storage contain the data in a comma-delimited or other simple file format easily read by employing standard techniques.

The memory device typically has enough capacity to store data for thousands of hours—possibly, the aircraft's entire service history—so maintenance personnel may be able to employ a ground-based display to show data not only for the most recent flight but also for some selection of previous data, such as the most-recent five flights, the previous ten flight hours, all data since the last overhaul, the last two hundred hours, or the entire service history, together with indications highlighting any anomalies.

The present invention's approach to multirotor vehicle operation and control, coupled with its onboard equipment for measuring, analyzing, displaying and predicting motor and controller items that can be adjusted, and for calculating whether the commanded motion is safe and within the vehicle's capabilities, can significantly enhance the safety and utility of this novel aircraft design, and reduce the probability of a novice operator attempting to operate outside of the vehicle's normal operational limits. It therefore constitutes a significant advance in the art.

Figure 6:
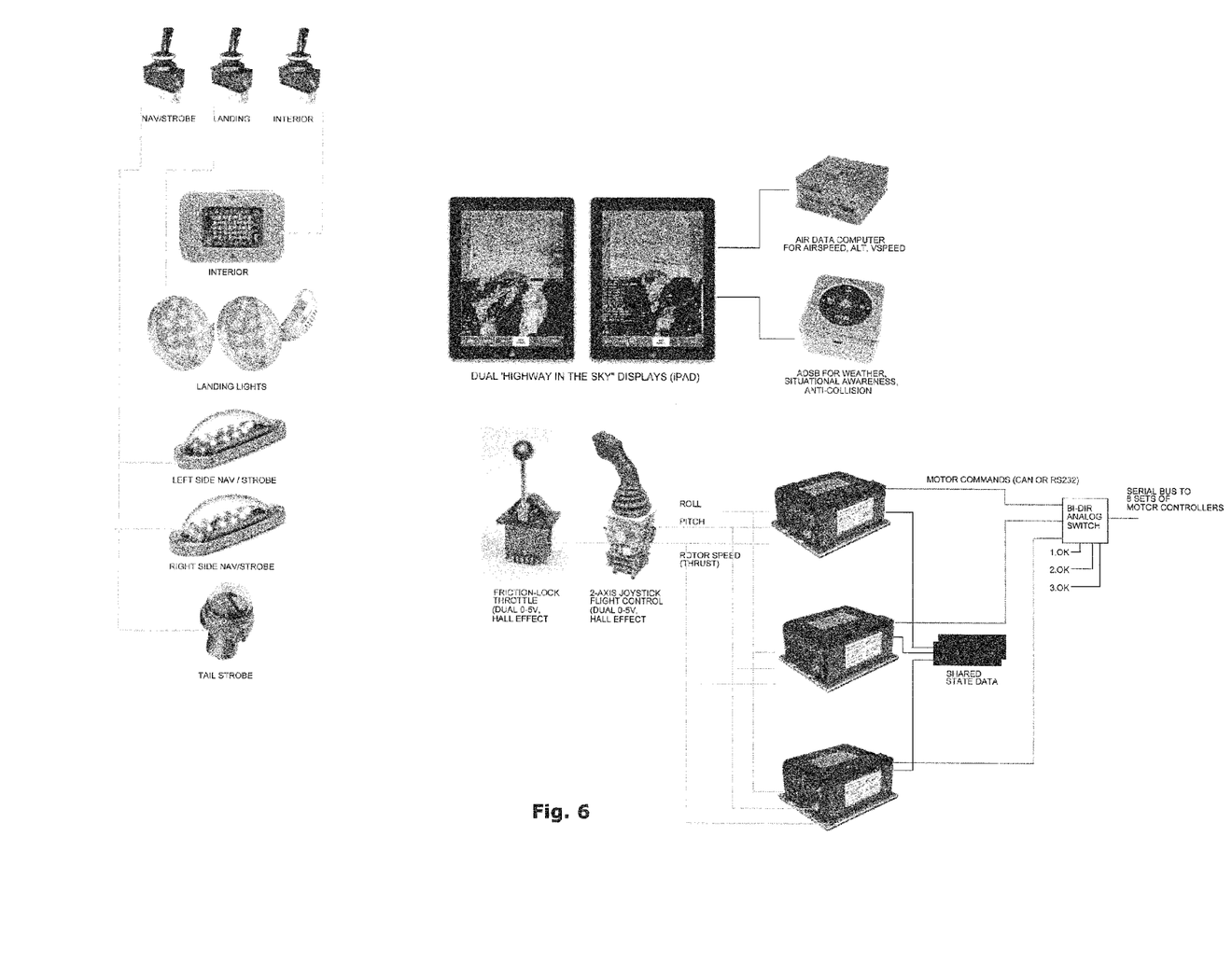
FIG. 6 shows electrical connectivity of various control interface components of a system of the invention.

FIG. 6 shows electrical connectivity of components of the control interface components, including the controllers for navigation/strobe, landing lights, and for interior, as well as the friction-lock throttle and 2-axis joystick flight controller as coupled via controllers to the eight motor controllers.

Figure 7:
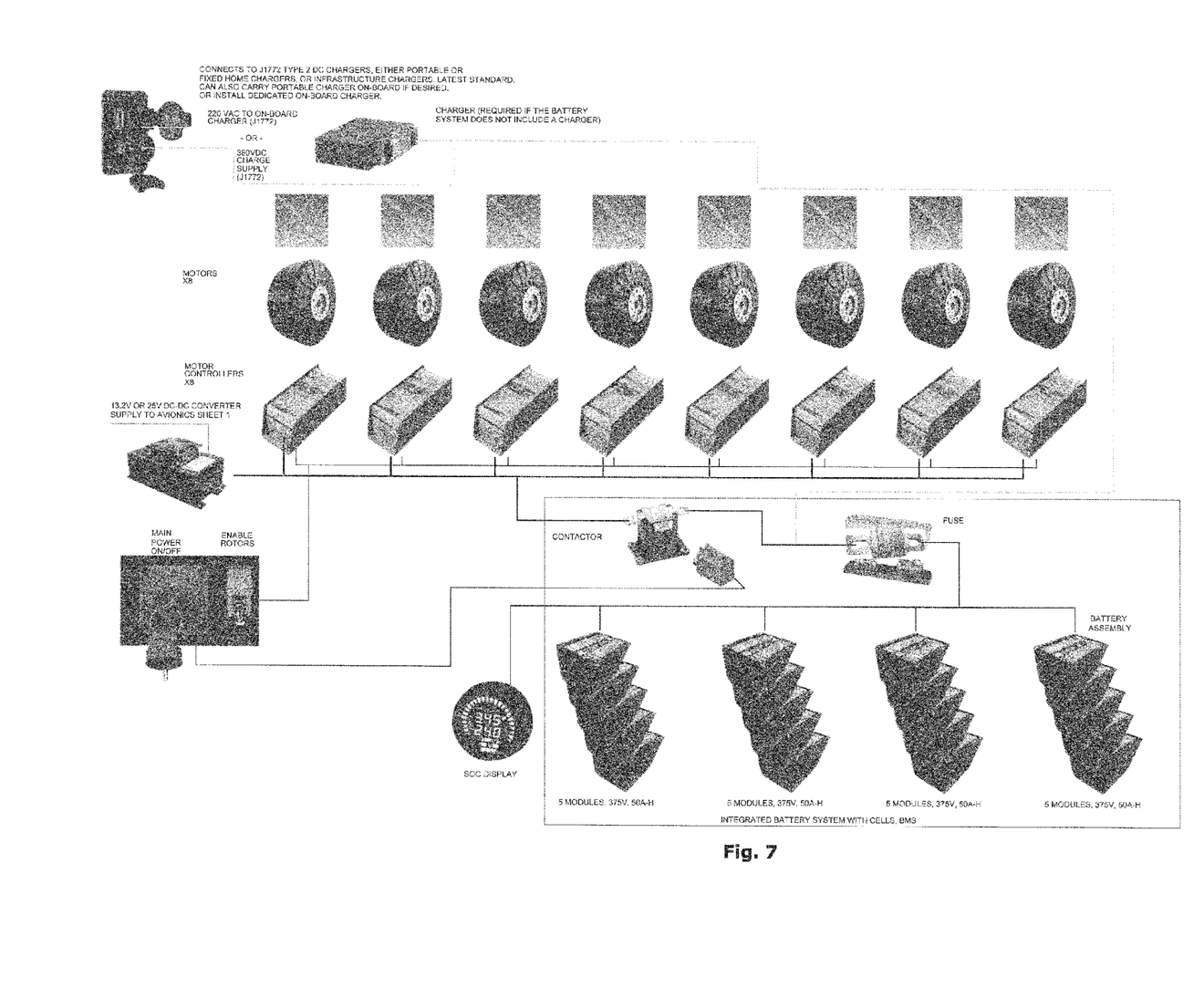
FIG. 7 shows electrical connectivity of various motor control components of a system of the invention.

FIG. 7 shows electrical connectivity of the eight motor controllers that control the independent movement of the eight motors. FIG. 7 also shows the redundant battery module system as well as components of the DC charging system.

Figure 8:
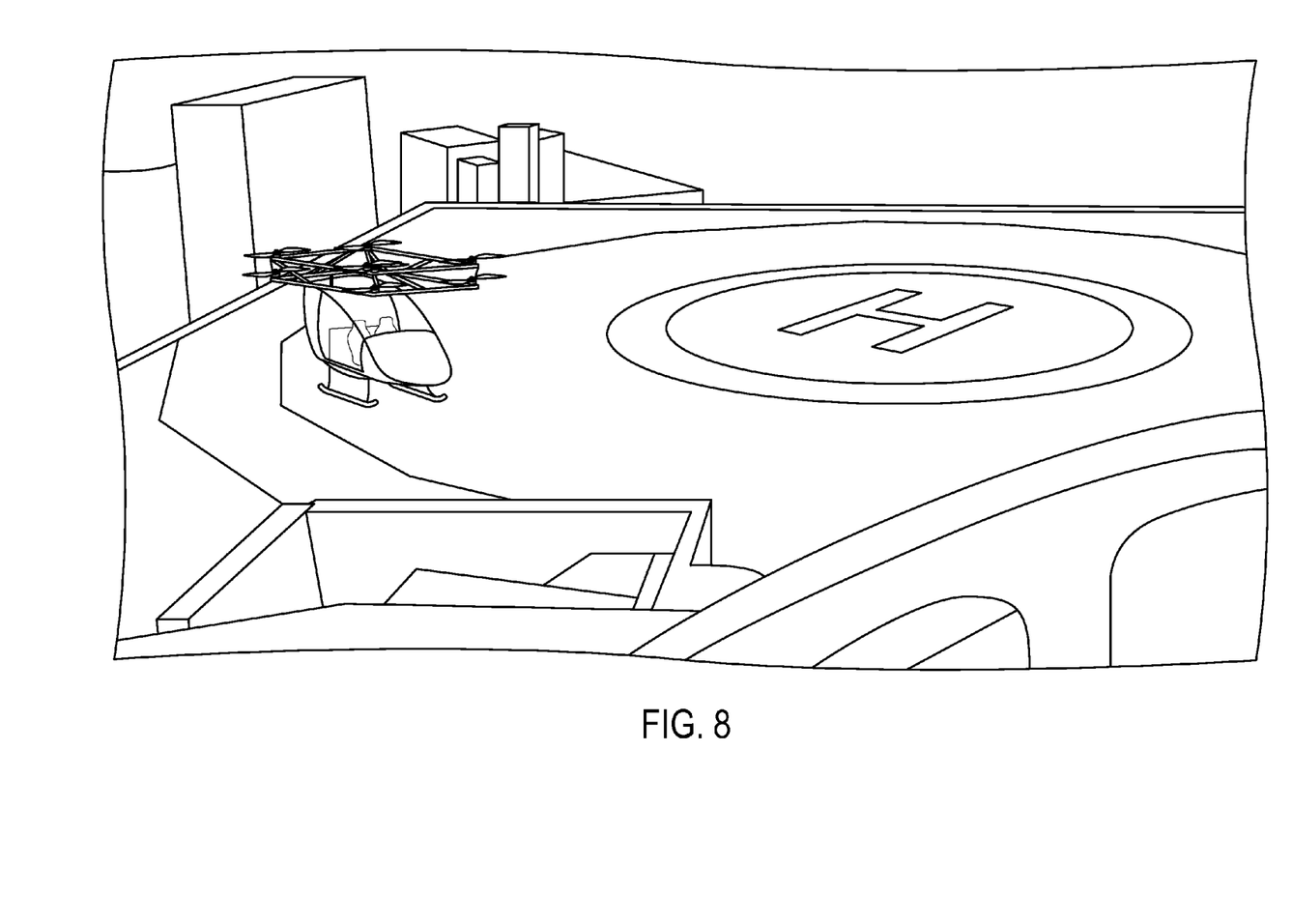
FIG. 8 shows a view of an aircraft in accordance with an embodiment of the present invention.
Figure 9:
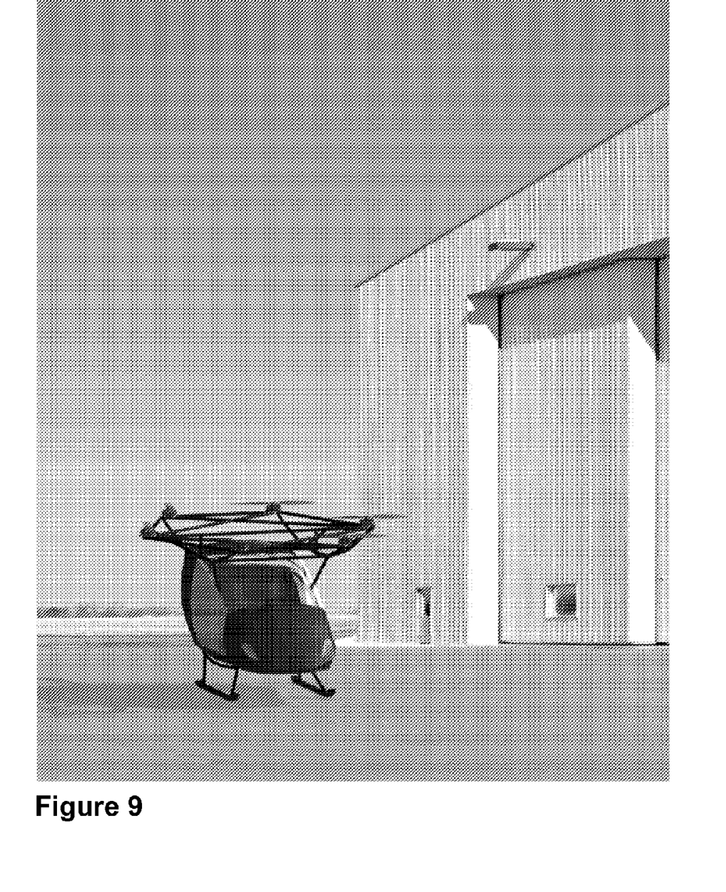
FIG. 9 shows an enlarged view of the truss structure the aircraft of FIG. 8.

FIG. 8 shows an aircraft in accordance with an embodiment of the present invention including a truss system and an aircraft body, and FIG. 9 shows an enlarged view of the truss system as coupled to the frame of the aircraft body shown in FIG. 8. The multiple electric motors are supported by the truss structure, and when the aircraft is elevated, the truss structure supports (in suspension) the aircraft itself.

The methods and systems described herein are not limited to a particular aircraft or hardware or software configuration, and may find applicability in many aircraft or operating environments. For example, the algorithms described herein can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: throttle pedal, throttle arm, sidearm controller, yoke or control wheel, or other motion-indicating device capable of being accessed by a processor as provided herein, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

As provided herein, the processor(s) can thus in some embodiments be embedded in three identical devices that can be operated independently in a networked or communicating environment, where the network can include, for example, a Local Area Network (LAN) such as Ethernet, or serial networks such as RS232 or CAN. The network(s) can be wired, wireless, or broadband, or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices to perform the necessary algorithms and determine the appropriate vehicle commands, and if implemented in three units, the three units can vote among themselves to arrive at a 2 out of 3 consensus for the actions to be taken.

The device(s) or computer systems that integrate with the processor(s) for displaying the highway in the sky presentations can include, for example, a personal computer with display, a workstation (e.g., Sun, HP), a personal digital assistant (PDA) or tablet such as an iPad, or another device capable of communicating with a processor(s) that can operate as provided herein. Accordingly, the devices provided herein are not exhaustive and are provided for illustration and not limitation.

References to "a processor" or "the processor" can be understood to include one or more processors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application.

References to a network, unless provided otherwise, can include one or more networks, intranets and/or the internet.

Although the methods and systems have been described relative to specific embodiments thereof, they are not so limited. For example, the methods and systems may be applied to a variety of multirotor vehicles having 6, 8, 10, 12, 14, 16, or more independent motor controllers and motors, thus providing differing amounts of lift and thus payload and operational capabilities. The system may be operated under an operator's control, or it may be operated via network or datalink from the ground. The vehicle may be operated solely with the onboard battery storage capacity, or it may have its capacity augmented by an onboard motor-generator or other recharging source, or it may even be operated at the end of a tether or umbilical cable for the purposes of providing energy to the craft. Obviously many modifications and variations may become apparent in light of the above teachings and many additional changes in the details, materials, and arrangement of parts, herein described and illustrated, may be made by those skilled in the art.

What is claimed is:

1. A full-scale, multirotor vertical takeoff and landing (vtol) electric aircraft system capable of transporting a plurality of human occupants and payload, comprising:
   a. a multirotor vtol electric aircraft having a plurality of components;
   b. a system comprising the plurality of components where the system comprises safety and reliability attributes necessary to safely and reliably transport human occupants and satisfy Federal Aviation Administration (FAA) or International Civil Aviation Organization (ICAO) regulatory safety-of-flight rules;
   c. a physical airframe structure which mounts the plurality of components, capable of supporting a weight of the multirotor vtol electric aircraft with one or a plurality of human occupants and payload;
   d. a physical motor attachment structure that provides mounting attachments for a plurality of electric motor and propeller subassemblies, and that transfers lift generated by the motor and propeller subassemblies to the airframe, passengers, and payload;
   e. a plurality of electric motor and propeller subassemblies reliably attached to the multirotor attachment structure and connected to the airframe or fuselage;
   f. the plurality of electric motor and propeller subassemblies comprising pairs of motor and propeller subassemblies where each pair comprises two counter-rotating motors and counter-rotating propellers;
   g. the plurality of electric motors being controlled by a plurality of electric motor controllers;
   h. a ground support structure comprising landing skids or wheels capable of supporting the airframe structure and a plurality of occupants, avionics, motors, electronics and batteries;
   i. the plurality of motor electric controllers to control a commanded voltage and torque generated by each motor and to measure its performance, comprising RPM and voltage and current;
   j. a motor control or autopilot system comprising the plurality of motor electric controllers or autopilots, where the redundancy satisfies the safety and reliability required to meet regulatory safety-of-flight rules;
   k. an On/Off switch connected to a high-current fuse and high-current contactor that isolates a battery system from a remainder of the system when the battery system is not required or is being charged, the battery system comprising a plurality of rechargeable high-energy density batteries connected in serial and parallel configurations to supply a required voltage and current;
   l. a battery charger comprising a unit configured to receive external power accessed through a charging connector to recharge the batteries after use;
   m. a battery display system that outputs performance metrics for the batteries;
   n. a safety switch configured to provide a means of disabling and enabling an entire motor system;
   o. an external charging connector compatible with infrastructure chargers for the multirotor vtol electric aircraft to enable multirotor vtol electric aircraft recharging;
   p. a dual display system comprising an application software operating on a touch-tablet computer or an avionics display system, the dual display system capable of displaying a planned three-dimensional path from origin to destination;
   q. an Automatic Dependent Surveillance-B (ADSB) unit configured to provide the avionics display system with collision avoidance, traffic, and weather information to and from the multirotor vtol electric aircraft;
   r. a motor management computer or autopilot comprising a computer and input/output interfaces, Controller Area Network (CAN), analog voltage inputs, analog voltage outputs, embedded or stand-alone air data computer capabilities, embedded or stand-alone inertial measurement capability, and a cross-communications channel or network;
   s. a DC-DC converter configured to down-regulate motor battery voltage for the multirotor vtol electric aircraft to either 12V or 24/28V standards, with a 12 or 24/28V battery to provide local storage, enabling the battery system to be recharged from one external connector;
   t. a throttle to provide a single or dual-redundant variable voltage or potentiometer setting indicative of commanded thrust;
   u. a two-axis joystick or control yoke to provide two independent sets of single- or dual-redundant variable voltage or potentiometer settings indicative of pitch command and bank command; and v. control algorithms operating within the single or redundant motor management computer or autopilot to perform analysis, comparisons, and generate commands to individual motor controllers and monitor results to control the multirotor vertical takeoff and landing (vtol) electric aircraft for transporting multiple occupants and payload.

2. The system of claim 1, further comprising controlling the plurality of electric motors to operate the multirotor vtol electric aircraft within the predetermined performance limitations.

3. The system of claim 1, further comprising systems to operate and control the multirotor vtol electric aircraft within safety, reliability, performance and redundancy measures necessary to protect human life to accepted FAA flight-worthiness standards.

4. The system of claim 1, further comprising use of electric motors for a non-hydrocarbon powered multirotor aircraft with performance and features to meet FAA or international aviation requirements.

5. The system of claim 1, further comprising redundancy features to safely operate and land the multirotor vtol electric aircraft:
   a. with one or a pair of motors being inoperative or underperforming;
   b. with one or a pair of motor controllers being inoperative or underperforming;
   c. with one or more motor management computers or autopilots being inoperative or underperforming; or
   d. with one cross-communication channel or network being inoperative or underperforming.

6. The system of claim 1, further comprising a multiplicity of pancake, axial flux brushless synchronous three-phase AC or DC brushless electric motors.

7. The system of claim 1, further comprising a lightweight upper truss structure that provides mounting attachments for the plurality of motor and propeller subassemblies, and that transfers the lift generated by the plurality of motor and propeller subassemblies to the airframe fuselage, passengers, batteries, payload and electronics.

8. The system of claim 1, further comprising high-voltage, high-current motor controllers capable of up to 100 kW peak performance each that comprises:
   a. air-cooling for the removal of waste heat; or
   b. liquid-cooling for the removal of waste heat.

9. The system of claim 1, further comprising a motor that is operated as an aircraft motor.

10. The system of claim 1, further comprising:
   a. a propeller or rotor attached to each motor to provide lift or thrust predominantly in a vertical direction;
   b. the pairs of motors affixed with propellers or rotors operating in counter-rotating fashion, so as to produce no net torque to the multirotor vtol electric aircraft, and thereby negating a need for a tail rotor.

11. The system of claim 1, further comprising a lightweight outer canopy or shell to protect occupants from airstream and weather while allowing visibility without negating the lift generated by the plurality of motor and propeller assemblies.

12. The system of claim 1, further comprising:
   a. multiple series/parallel connected high-energy density, high-current rechargeable battery cells;
   b. a Battery Management System (BMS) to monitor and control battery voltage, current, and charge level, and to report status for charging and discharging of the batteries;
   c. a recharging system for the multirotor vtol electric aircraft compatible with industry electric vehicle recharging stations;
   d. the (BMS) comprises components to recharge the multirotor vtol electric aircraft's batteries at the origin, at the destination, or at roadside or rooftop electric vehicle charging stations;
   e. the (BMS) comprises components to operate the multirotor vtol electric aircraft in a manned or unmanned mode coupled with a tethered power cable; or
   f. the (BMS) comprises components to use a portion of the multirotor vtol electric aircraft main battery pack to power onboard avionics through a DC-to-DC converter thereby alleviating a need for separate battery chargers or external charging ports.

13. The system of claim 1, wherein the pairs of motors may be commanded to operate at different RPM or Torque settings to produce slightly differing amounts of thrust under the motor management computer or autopilot control, thus imparting a pitch moment, or a bank moment, or a change in altitude, or simultaneously combinations thereof to the multirotor vtol electric aircraft, using position feedback from on-board multi-axis sensors to maintain stable flight attitude.

14. The system of claim 1, wherein multi-axis sensor data is read by each motor management computer or autopilot to assess physical motion and rate of motion, which is then compared to commanded motion in all three axes to determine what new motion is required.

15. The system of claim 1, wherein controlling the plurality of motors comprises:
   a. means for maintaining a specified altitude, under command of a thrust lever and the motor management computer or autopilot;
   b. means for increasing or decreasing altitude of the multirotor vtol electric aircraft, under command of the thrust lever and the motor management computer or autopilot;
   c. means for maintaining a specified pitch and bank angle, under command of the sidearm controller and command of the motor management computer or autopilot;
   d. means for changing the pitch and bank angles independently, under command of the sidearm controller and the motor management computer or autopilot;
   e. means for allowing the operator to fly a specified origin-to-destination route by following a dual display;
   f. means for monitoring available electrical battery capacity to ensure adequate power remains for performing a mission;
   g. means for performing motor control algorithms within one to three identical microprocessor-controlled units; or
   h. means for employing voting techniques to arrive at a majority decision for every command, which is a part of providing necessary reliability and safety levels for the system and improving a tolerance to computer, calculation, or system faults.

16. The system of claim 1, wherein the avionics display system for the multirotor vtol electric aircraft comprising interfaces to airspace management resource ADSB capability to:
   a. receive broadcast data from other nearby aircraft, and to thereby allow the multirotor vtol electric aircraft to avoid close encounters with other aircraft;
   b. broadcast own-aircraft position data to avoid close encounters with the other aircraft;
   c. receive weather data for display to the operator and for use by the avionics display system within the multirotor vtol electric aircraft;

d. allow operation of the multirotor vtol electric aircraft with no requirement to interact with or communicate with air traffic controllers; and
e. perform calculations for flight path optimization, based upon own-aircraft state, cooperating aircraft state, efficiency, and available flight path dynamics under a National Airspace System or international systems.

17. The system of claim 1, wherein the multirotor vtol electric aircraft is configured for operation in manned mode or unmanned mode, and where one or more of the position and control instructions when operating in the unmanned mode are performed outside the multirotor vtol electric aircraft, in ground-based equipment, by using a broadband, 802.11 Wi-Fi network or Radio Frequency (RF) bidirectional data-link between the multirotor vtol electric-aircraft and the ground-based equipment,
   a. wherein the unmanned mode enables untethered operation in hostile environments or other unmanned applications, subject only to battery capacity and RF or wireless network range; and
   b. wherein the unmanned mode enables unmanned, tethered operation for long-duration surveillance or other missions where a significant payload is desired.

18. A method of providing a full-scale, multirotor vertical takeoff and landing electric aircraft capable of transporting multiple occupants and payload, the method comprising the steps of:
   a. providing a multirotor airframe having a plurality of components;
   b. providing a physical structure that connects each of the components to each other, capable of supporting a total weight of the multirotor vtol electric aircraft with two or more human passengers;
   c. providing a lightweight multirotor upper truss structure that provides mounting attachments for multiple motor and propeller assemblies, and that translates a lift of the multiple motor and propeller assemblies to a mass of the multirotor airframe fuselage, passengers, batteries, and electronics;
   d. providing a plurality of the multiple motor and propeller assemblies reliably attached to the lightweight multirotor upper truss structure and connected to the multirotor airframe fuselage, the multiple motor and propeller assemblies each having a plurality of pairs of counter-rotating propellers, and motors being controlled by a plurality of motor controllers;
   e. providing the multirotor fuselage with landing skids or wheels to support up to two occupants, avionics and necessary controller electronics and to protect occupants from weather;
   f. providing a high energy-density battery system consisting of a plurality of rechargeable battery cells to supply current to the plurality of motor controllers;
   g. providing a battery management system to monitor and control charging and discharging of the battery system;
   h. the plurality of motor controllers controlling a commanded voltage and torque to each motor and measuring its performance;
   i. providing a motor control or autopilot system comprising the plurality of motor controllers or autopilots, where the redundancy provides the safety and reliability required to satisfy safety-of-flight rules;
   j. providing communications means comprising serial RS232, Controller Area Network (CAN), or Ethernet interfaces as cross-communications channel or network, channel or network allowing the plurality of motor controllers or the autopilots to share state data and commands for comparison or voting purposes;
   k. providing an avionic display system having an interface for receiving broadcast data from other nearby aircraft, and to enable the multirotor vertical takeoff and landing electric aircraft to avoid close encounters with other aircraft;
   l. providing the avionic display system having an interface for broadcasting own-aircraft position data to avoid close encounters with the other aircraft;
   m. providing the avionic display system having an interface for receiving weather data for display to a pilot and for use by an avionics display system within the multirotor vertical takeoff and landing electric aircraft;
   n. providing the avionic display system having an interface for allowing operation of the multirotor vertical takeoff and landing electric aircraft with little or no requirement to interact with or communicate with air traffic controllers; and
   o. providing the avionic display system having an interface for performing calculations for flight path optimization and efficiency based upon own-aircraft state, cooperating aircraft state, the other nearby aircraft projected flight paths, and predicted flight path dynamics under the National Airspace System or international airspace management systems; and controlling the multirotor vertical takeoff and landing (vtol) electric aircraft by a redundant digital Motor Management Computer (MCC) for transporting multiple occupants and payload.

19. The method of claim 18, wherein the method further comprises the steps of:
   a. maintaining a specified altitude, under command of a thrust lever and the plurality of motor controllers or the autopilots;
   b. increasing or decreasing an altitude of the aircraft, under command of the thrust lever and the plurality of motor controllers or the autopilots;
   c. maintaining a specified pitch and bank angle, under command of a sidearm controller and command of the plurality motor controllers or the autopilots;
   d. increasing or decreasing pitch and bank angles independently, under command of the sidearm controller and the plurality motor controllers or the autopilots;
   e. allowing the pilot to fly a specified origin-to-destination route by following a display presentation by the avionic display system;
   f. a battery management system monitoring available electrical battery capacity to ensure adequate power remains for performing a mission; and
   g. the MMC performing motor control algorithms within one to three microprocessor-controlled units, and if three units are present, employing voting techniques to arrive at a two-out-of-three decision for every command, thus achieving the necessary reliability and safety requirements for the system and improving the tolerance to computer, calculation, or system faults.

* * * * *